United States Patent

Collette et al.

[11] Patent Number: 5,582,788
[45] Date of Patent: Dec. 10, 1996

[54] METHOD OF COOLING MULTILAYER PREFORMS

[75] Inventors: Wayne N. Collette, Merrimack; Thomas E. Nahill, Amherst; Suppayan M. Krishnakumar, Nashua, all of N.H.

[73] Assignee: Continental PET Technologies, Inc., Florence, Ky.

[21] Appl. No.: 365,205

[22] Filed: Dec. 28, 1994

[51] Int. Cl.⁶ .............. B29C 45/16; B29C 45/72; B29C 49/06
[52] U.S. Cl. .............. 264/297.2; 264/328.14; 264/328.16; 264/513; 264/519; 264/538; 264/904; 264/328.8; 425/526; 425/533; 425/547; 425/534
[58] Field of Search .............. 264/297.2, 328.8, 264/328.14, 328.16, 513, 519, 537, 538, 904; 425/533, 534, 526, 523, 547, 577, 588

[56] References Cited

U.S. PATENT DOCUMENTS

| | | | |
|---|---|---|---|
| 3,642,397 | 2/1972 | Schippers et al. | 425/516 |
| 4,201,535 | 5/1980 | Ninneman | 264/328.8 |
| 4,330,257 | 5/1982 | Rees et al. | 425/556 |
| 4,568,261 | 2/1986 | McHenry et al. | 264/328.8 |
| 4,786,455 | 11/1988 | Krishnakumar et al. | 264/237 |

Primary Examiner—Jill L. Heitbrink
Attorney, Agent, or Firm—Wolf, Greenfield & Sacks, P.C.

[57] ABSTRACT

Method of making multilayer preforms which resist delamination and in a reduced cycle time. A first array of preforms are molded onto a first array of cores in an associated array of mold cavities, the cores and preforms are removed from the mold cavities as soon as possible without significant physical preform deformation, and the preforms are then cooled on the cores while a second array of cores is positioned in the mold cavities. Cooling on the cores prevents delamination of the preform layers and reduces the in-mold cooling time. Providing multiple sets of cores on a rotating turret further reduces the cycle time compared to the prior art use of robotic cooling tubes.

30 Claims, 5 Drawing Sheets

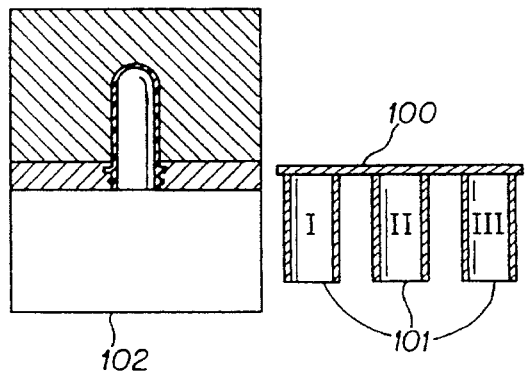
FIG. 6A
(PRIOR ART)
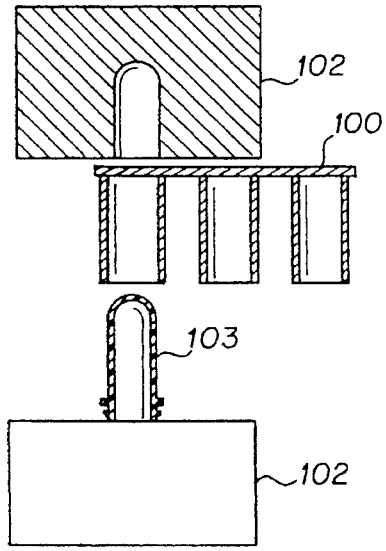
FIG. 6B
(PRIOR ART)
| | LOAD$_0$ | | | UNLOAD$_0$ | | |
|---|---|---|---|---|---|---|
| | COOLING TUBE NUMBER | | | COOLING TUBE NUMBER | | |
| CYCLE # | I | II | III | I | II | III |
| 1 | ① | E | E | E | E | E |
| 2 | 1 | ② | E | 1 | 2 | E |
| 3 | 1 | 2 | ③ | Ⓔ | 2 | 3 |
| 4 | ④ | 2 | 3 | 4 | Ⓔ | 3 |
| 5 | 4 | ⑤ | 3 | 4 | 5 | Ⓔ |
| 6 | 4 | 5 | ⑥ | Ⓔ | 5 | 6 |
| 7 | ⑦ | 5 | 6 | 7 | Ⓔ | 6 |
| 8 | 7 | ⑧ | 6 | 7 | 8 | Ⓔ |
| 9 | 7 | 8 | ⑨ | Ⓔ | 8 | 9 |
FIG. 6C
(PRIOR ART)

METHOD OF COOLING MULTILAYER PREFORMS

FIELD OF THE INVENTION

The present invention relates to the large-volume manufacture of multilayer preforms for plastic containers, and more particularly to an improved method of cooling multilayer preforms without layer separation and at a reduced manufacturing cycle time.

BACKGROUND OF THE INVENTION

At present the large-volume commercial production of preforms for plastic containers, such as polyethylene terephthalate (PET) beverage bottles, utilizes multiposition robotically-activated cooling tubes to reduce the overall cycle time. A conventional post-mold robotic cooling system receives partially-cooled injection-molded preforms from the mold, cools the preforms down to a temperature sufficient to allow their release without damage onto a conveyor belt or into a large storage container (gaylord), and meanwhile frees the mold cavity for the injection of the next set of preforms. For example, as illustrated schematically in FIGS. 6A–6C, a three-position robotic cooler 100 having 96 cooling tubes 101 may work in conjunction with a 32-cavity injection molding machine 102 by sequentially accepting three sets (I, II, III) of freshly-molded preforms for pose mold cooling. While one set of preforms 103 is received from the mold cores (see FIG. 6B), the previous two sets are cooling in the robot cooling tubes. After remaining in the cooling tubes for two injection mold cycles, the first set of preforms are now released onto the conveyor or into the gaylord, being sufficiently cool that no surface damage or physical distortion (i.e., warpage) occurs by such transfer, and the robotic cooler then returns to accept another set of freshly molded preforms. FIG. 6A illustrates the "mold close" position during injection molding of one set of preforms; FIG. 6B illustrates the "mold open" position wherein the one set of preforms are transferred off the cores and into The cooling tubes; and FIG. 6C illustrates the sequential filling/emptying of the cooling tubes over successive molding cycles.

However, there is a problem optimizing the high-speed robotic cooling production process with multilayer preforms. More specifically, it has been found that there is a tendency for such preforms to delaminate in the cooling tubes. Delamination refers to separation of the multilayer structure at the boundary of different material layers. A delaminated preform is totally unusable and must be discarded, resulting in reduced manufacturing efficiency and higher unit costs. To prevent delamination, efforts have been made to increase the cooling time in the mold, however, this increases the cycle time and reduces the production throughput. Another approach is to increase the cooling tube water temperature, but this also reduces its effectiveness and increases cycle time. Another approach is to provide adhesives between the layers to prevent delamination, but such adhesives render the containers nonrecyclable (i.e., during recycling, the multiple layers of the container must be separated and the materials of the various layers reclaimed). Thus, at present there is no satisfactory solution to this problem.

It would be commercially desirable to provide preforms for smaller size multilayer plastic containers, such as a 16 or 20-ounce single service juice container. However, it is difficult utilizing prior art injection technology to provide such preforms at a cost which can compete with glass bottles or juice boxes (i.e., Tetra-pak). Thus, many small-size beverage containers are still made of glass or multilayer boxes, in spite of the weight and breakage (safety) problems of glass and the nonrecyclability of juice boxes. The problem with present commercial PET preform production is that it is only cost-competitive vs alternative materials for larger size containers. Thus, PET preform manufacturers must increase production and capital efficiency in order to market smaller size containers at a price competitive with glass and juice box alternatives.

Therefore, it would be desirable to provide a method of making multilayer preforms without delamination and in a cost-effective and capital-efficient manner.

SUMMARY OF THE INVENTION

The present invention is a method of cooling multilayer preforms without delamination and with an increase in throughput. The method enables earlier removal of the preforms from the injection mold cavity and cooling of the preforms (external to the injection mold) on cores such that post-mold shrinkage forces do not cause delamination of the multilayer preforms. A significant reduction in cycle time is achieved over the known multiposition robotic cooling method.

More specifically, a first array of preforms are formed on a first array of cores in the mold cavities. The preforms are cooled in the mold at a fairly high rate, based on exterior heat transfer to the cooler mold cavity walls and interior heat transfer to the cooler core walls. The cooling time in the mold is reduced to a time sufficient to enable the preforms to be withdrawn from the mold cavities while remaining on the cores for cooling, without the preforms undergoing any significant physical deformation. The mold cooling time may be reduced for example to about two seconds, as opposed to the typical prior art six-second (or more) mold cooling period. This frees the injection mold for the introduction of a new array of cores and the molding of a second array of preforms, while the first array of preforms are cooled on the first set of cores. In addition, by providing multiple arrays of cores on a rotating turret, the positioning of multiple sets of cores sequentially in the mold cavities can be done more efficiently, compared to the prior art robotic system.

Once the first array of preforms on the cores are removed from the mold cavities, they are allowed to cool on the cores for one or more additional molding cycles. Because they are removed at a higher temperature, the preforms are maintained at a higher temperature for a longer time period; the higher time/temperature condition results in increased polymer mobility and additional molecular ordering, diffusion, and/or higher levels of hydrogen bonding, at the layer boundaries. This yields improved layer adhesion (no delamination during the injection process) and improved delamination resistance on drop impact (after conversion to blown containers), but still allows separation of the layers for recycling purposes.

These and other benefits of the present invention will be more particularly described with respect to the following detailed description and figures.

BRIEF DESCRIPTION OF THE FIGURES

FIG. 6A–6C illustrate the prior art robotic cooling method showing the "mold close" step in FIG. 6(A), the "mold open" step in FIG. 6(B), and the sequence of cooling for three sets of preforms in FIG. 6(C).

DETAILED DESCRIPTION

Figure 1A:
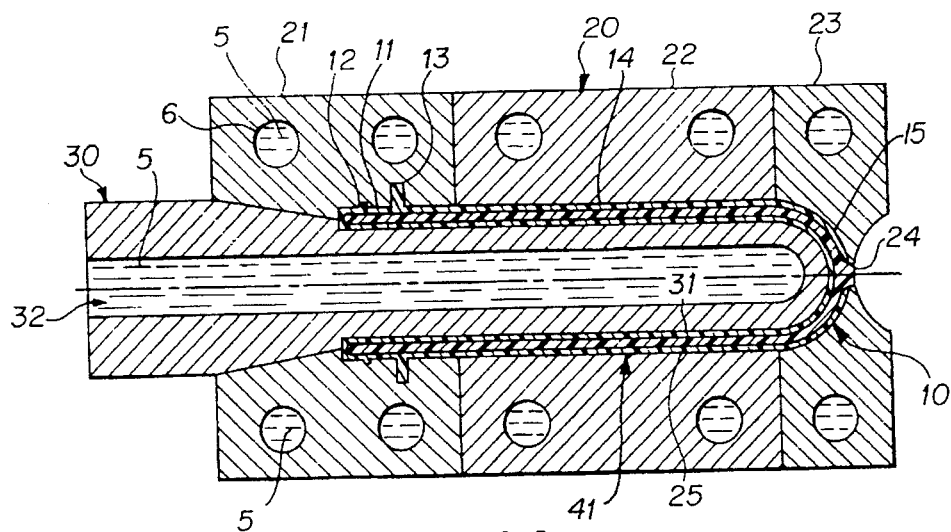
FIG. 1A is a cross-sectional view of a multilayer preform between an injection mold cavity and core.
Figure 1B:
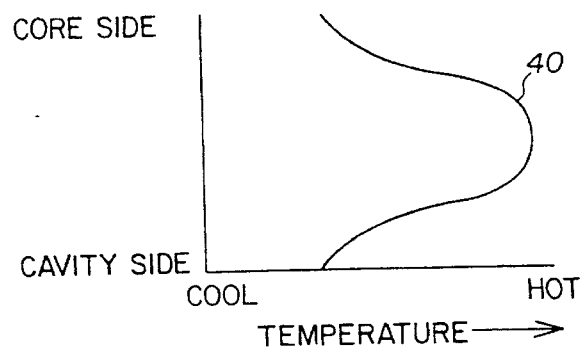
FIG. 1B is a graph showing the temperature profile across the preform wall.
Figure 1C:
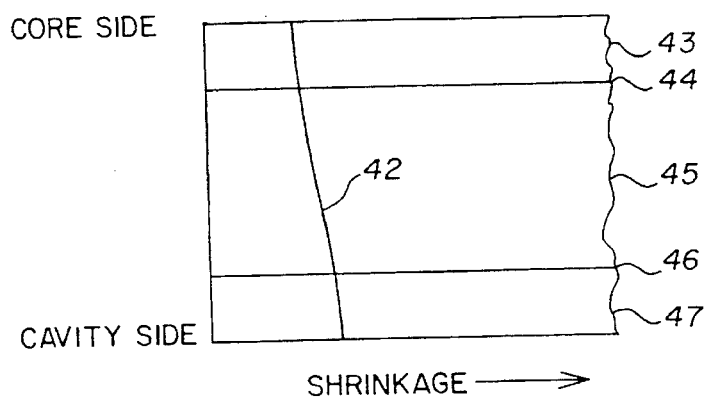
FIG. 1C is a graph showing the magnitude of shrinkage across the preform wall.
Figure 2A:
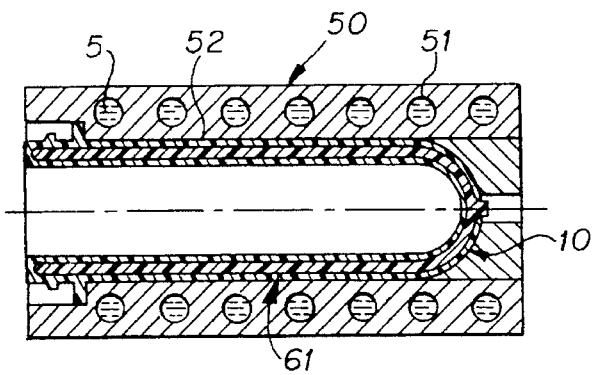
FIG. 2A is a cross-sectional view of a multilayer preform in a prior art robotic cooling tube.
Figure 2B:
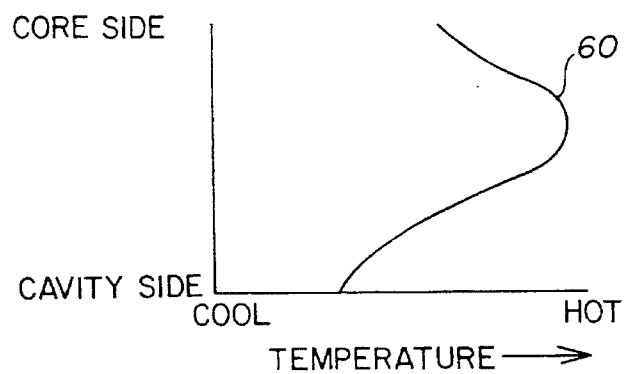
FIG. 2B is a graph showing the temperature profile across the preform wall.
Figure 2C:
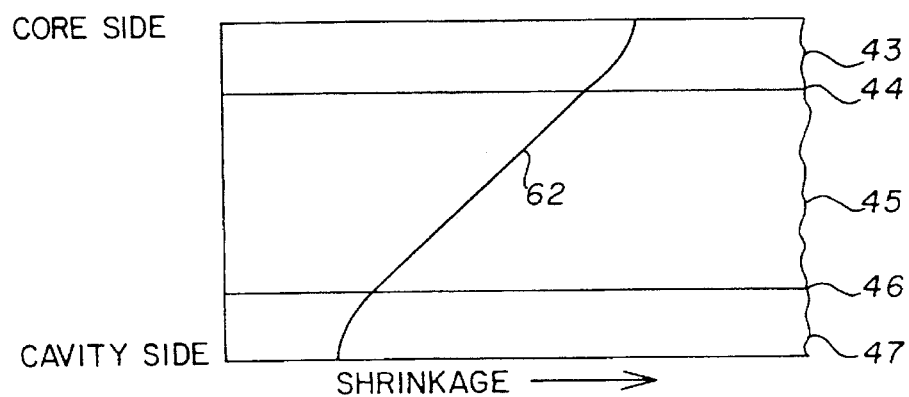
FIG. 2C is a graph showing the magnitude of shrinkage across the preform wall.
Figure 3A:
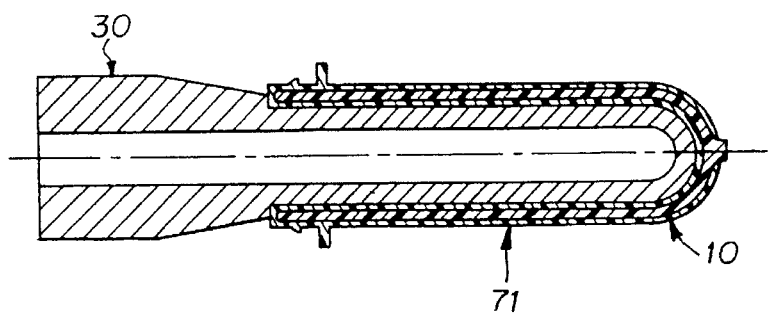
FIG. 3A is a cross-sectional view of a multilayer preform being cooled on a core in accordance with the present invention.
Figure 3B:
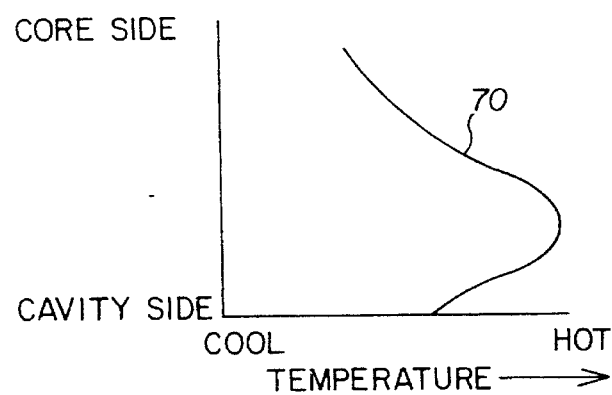
FIG. 3B is a graph showing the temperature profile across the preform wall.
Figure 3C:
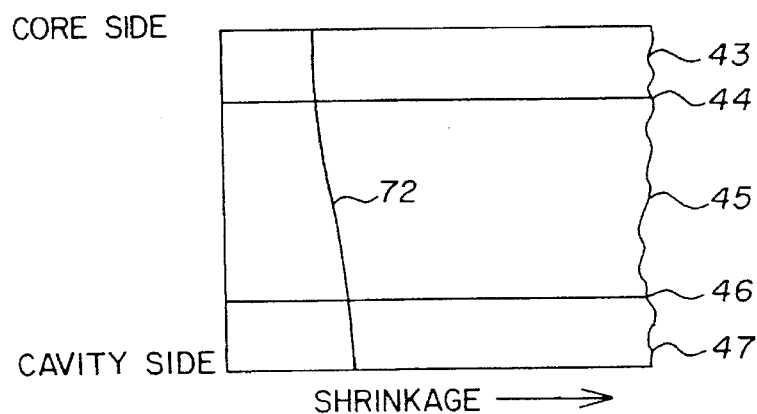
FIG. 3C is a graph showing the magnitude of shrinkage across the preform wall.

FIGS. 1–3 illustrate the temperature gradient and shrinkage forces across a multilayer preform wall when it is: within an injection mold (FIG. 1); within a prior art cooling tube (FIG. 2); and on a cooling core in accordance with the present invention (FIG. 3). In FIGS. 1C and 3C, the shrinkage is more uniform through the thickness of the preform sidewall, than in FIG. 2C. When the shrinkage is uniform, the shear forces are low, resulting in low delaminating forces. Just the opposite is true in the case of FIG. 2C where the nonuniform shrinkage (due to unrestricted core side shrinkage) produces high shear forces between layers, resulting in high delamination forces. Thus, comparing FIGS. 2–3 illustrates how the present invention avoids the high shear force which creates the delamination problem of the prior art.

FIG. 1A shows a multilayer preform 10 in an injection mold disposed between an elongated mold cavity 20 and cylindrical core 30. The preform consists essentially of three portions: an upper neck finish portion 11 (with exterior threads 12 and a neck flange 13), an elongated cylindrical body portion 14, and a closed hemispherical bottom portion 15. The mold cavity 20 is similarly composed of an upper neck ring section 21, mid-body-forming section 22, and lower gate pad (base-forming section) 23. The mold (and hence the preform) is cooled by flowing chilled water 5 through cooling channels 6 in the mold. The core is similarly cooled by flowing chilled water through the interior 32 of the core. The melt streams, for various layers, enter through the gate 24 and flow upwardly between the outer surface 31 of the core and inner surface 25 of the mold cavity, to form the preform.

FIG. 1B shows a temperature profile 40 across (i.e., from core side To cavity side) a sidewall portion indicate 41 (see FIG. 1A) of the preform, just prior to removal form the cavity. There is a temperature gradient across The wall, with the outer (cavity side) and inner (core side) sides of the wall being at a substantially equal cooler temperature, due to heat transfer from the preform inner and outer exterior surfaces to the water-cooled cavity and core, and the interior of the preform being at a substantially higher (hotter) temperature.

FIG. 1C shows a shrinkage profile 42 across the same sidewall portion 41, due to the temperature gradient. In this example, a 5-layer preform is provided having inner 43 and outer 47 exterior layers of substantially virgin bottle-grade PET, inner and outer intermediate layers of a high-oxygen barrier material 44 and 46 (e.g., ethylene vinyl alcohol-EVOH), and a central core layer 45 of virgin PET. Alternatively, recycled or post-consumer PET (PC-PET) may be utilized in the central layer (at a reduced cost compared to virgin PET), or a high-temperature polymer, such as a PET copolymer with polyethylene napthalate (PEN) may be used for high-temperature applications (e.g., hot fill, refill). The intermediate EVOH layers 44, 46 can be very thin (relative to the thickness of the other layers), and provide the desired oxygen barrier property in a cost-effective manner. The core layer 45 may be on the order of 50% of the total wall thickness, and the inner and outer layers 43, 47 on the order of 25% each. Many variations in materials, number of layers, and layer thicknesses are possible, and the present invention is not restricted to any particular combination. MXD-6 nylon for example, may be used in place of EVOH as a barrier polymer.

As shown in FIG. 1C, during cooling in the injection mold the radial and axial shrinkages are low and uniform due to the core restricting the preform shrinkage. The layers are tightly forced together and there are low shear forces between the layers. Thus, delamination is not a problem. However, cooling in the mold greatly increases the cycle time as illustrated hereinafter.

FIG. 2A illustrates a multilayer preform (same as preform 10 of FIG. 1A) being cooled within a prior art robotic cooling tube 50. There is no core. Cooling tube 50 has cooling channels 51, through which chilled water flows, and the preform is cooled primarily from its outer exterior wall, which is (at least initially) in contact with the inner tube wall 52. Some air cooling may occur via the hollow interior of the preform, but primarily the preform cools from the exterior (cavity surface). The resulting temperature profile 60 (FIG. 2B) for wall segment 61 shows a hot center, cool outer wall (cavity side) and intermediate inner wall (core side). This temperature gradient and the unconstrained inner layer shrinkage produces higher and nonuniform shrinkage 62 as the warmer core side layers try to shrink away from the cooler cavity side layers (FIG. 2C, compare FIG. 1C), and the result is a weakening of the wall structure and layer separation or delamination below a critical mold cycle time (i.e., approximately 20 seconds for a 4 mm average wall thickness). The radial and axial shrinkages are high due to unrestricted internal diameter shrinkage (There is no core). High shrinkage leads to a weakened wall structure, and high shear forces between layers 43–47 (same layers as in FIG. 1). Still further, as the preform shrinks away from the tube wall, the heat transfer becomes less efficient, causing a necessary increase in the cycle time.

To solve these problems, FIG. 3A illustrates a multilayer preform (same preform 10 of FIG. 1A) being cooled on core 30 in accordance with this invention. Core 30 is the same core on which the preform is injection molded (in FIG. 1A), but core 30 and preform 10 are removed together from the mold cavity for cooling outside the mold to decrease the cycle time (as explained in detail below).

Core cooling provides a temperature profile 70 for sidewall segment 71.

As shown in FIG. 3B, the preform center is hot, the inner (core side) is cool, and the outer (cavity side) is at an intermediate temperature. However, this temperature gradient does not produce delamination because, as the shrinkage profile 72 of FIG. 3C illustrates, the radial and axial shrinkage are low and uniform due to the core restricting the internal diameter shrinkage. The layers are tightly forced together and there are low shear forces between layers.

The reduction in cycle time will now be illustrated.

Figure 4:
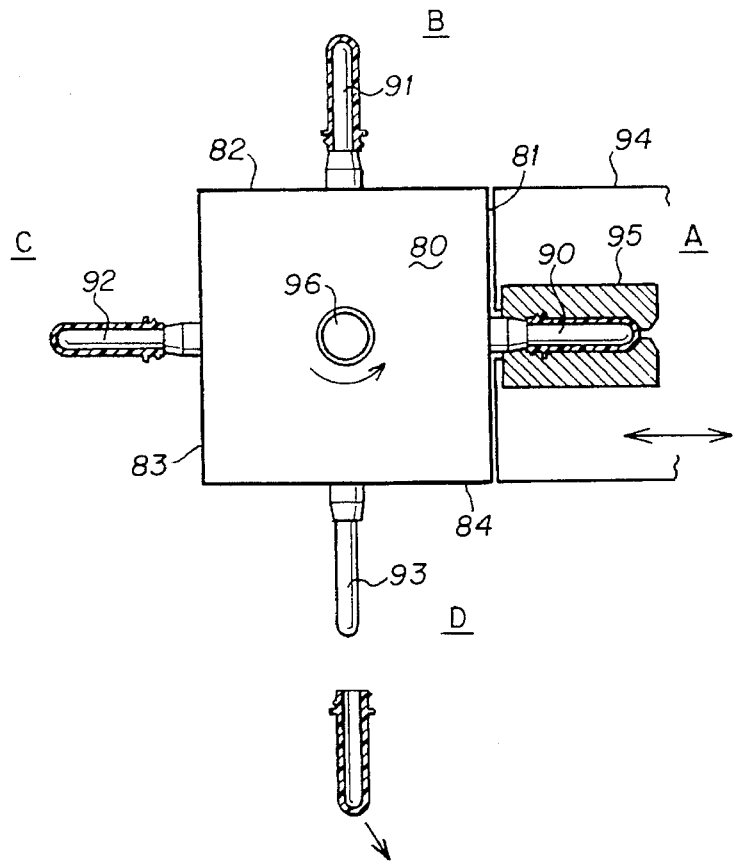
FIG. 4 is a schematic view of a rotary turret with a plurality of core sets for use in the method of the present invention.

FIG. 4 is a schematic illustration of a rotary turret 80, having multiple faces 81–84 (in this example four), each carrying a 2-dimensional array of cores (one core is shown on each face for representative purposes). Multiple core sees 90–93 are carried by the rotary turret so that as soon as the injection molded thermoplastic preform material has cooled from a molten fluid to a semi-rigid glassy state sufficient to permit its transfer with its associated core out of the injection mold cavity, the first set of preforms are removed from the mold and the rotating turret immediately presents a new set of free cores to the injection mold cavities. Again, although only one core and preform are shown on each face, it is to be understood that there are an array of cores on each face (i.e., 16 to 48, or more).

At a first station A, an injection mold 94 having an array of mold cavities 95 is moved into position over an associated array of cores 90, and multiple thermoplastic melt streams introduced to form a first array of multilayer preforms. The first column of Table I provides representative times for the various steps, to enable calculation of a complete cycle time, and later comparison with the extended cycle time of the prior art robotic cooling method. As shown in Table I, the mold is open and ready to close at time 0, closing the mold and clamp pressure (tonnage) build-up takes 2 seconds, and injection of the various melt streams for the different layers takes 7 seconds. Then, the preforms are allowed a minimum cooling time in the mold cavities, here 2 seconds, just enough to enable the preforms (carried by the cores) to be removed from the mold without undergoing any significant distortion. The mold is opened by moving the cores away from the cavities, the turret is rotated 90° about a central shaft 96, placing the next set of cores (from station D) into position for molding. It takes about 3 seconds to open the mold and rotate the turret. The total cycle time is thus 14 seconds.

TABLE I

|   | Turret/ Core Cooling (invention) | Multiposition Robotic Cooling (prior art) |
|---|---|---|
| 1. Mold open | 0 | 0 |
| 2. Mold close and clamp pressure | 2 | 2 |
| 3. Multilayer injection | 7 | 7 |
| 4. In-mold cooling | 2 | 6 |
| 5. Mold open (rotate turret or prior art robotic removal) | 3 | 5 |
| Total Cycle Time (sec) | 14 | 20 |

The first set of preforms are allowed to cool on the cores during one or more mold cycles. In this example, the preforms cool on the cores for two more cycles (at stations B and C), before being removed from the cores at station D. Alternatively, they could be ejected from the cores after only one cycle, depending on the preform thickness and materials.

The second column of Table I provides representative times for a robotic cooling injection cycle, and illustrates where a time savings results from the present invention. The first three steps are the same, but in the fourth step—cooling in the mold, robotic cooling requires a longer time (here 4 seconds longer). This is because robot cooling requires removal of the preforms off the cores as soon as the mold is open, and thus the preforms must be cooled longer in the mold so they can resist deformation when being stripped from the cores. In addition, the fifth step takes longer with robot cooling, here 2 seconds longer. In contrast to the present invention which only requires mold opening and turret turning to place the next set of cores in position, the robotic cooling method requires mold opening, insertion of the robot arm into position adjacent the cores (between the cores and mold cavities), stripping the preforms from the cores and insertion into the cooling tubes, retraction of the stripper mechanism, and removal of the robot arm (to enable reclosing The same cores in the mold cavities). Thus, the combination of rotational turret and core cooling provides a significant reduction in cycle time, here 6 seconds or 6/20= 30%.

Figure 5:
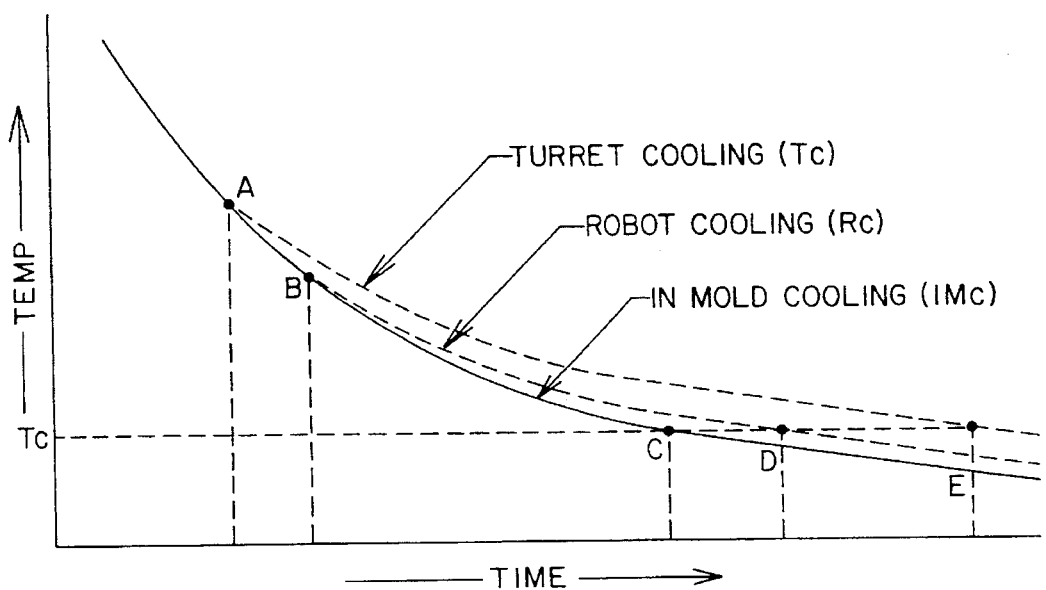
FIG. 5 is a graph comparing the preform temperature/time profiles for core cooling according to the method of the present invention, in-mold cooling, and the prior art robotic cooling.

FIG. 5 contains three time/temperature profiles, one for turret cooling (TC) according to this invention, one for robotic cooling (RC) according to the prior art method, and to provide a further basis of comparison, one for continued in-mold cooling (IMC). As indicated in Table I, the mold cooling time according to the present invention (TC) is decreased and thus at time A the mold is opened. This is important for two reasons: 1) decreased cycle time; and 2) the preform will remain at a higher temperature longer. Prior to time A, the preform is cooled at a relatively high rate of cooling in the mold; after time A, the rate of cooling is reduced. The rate is higher in the mold because the preform is cooled both by contact with the cold mold cavity and the cold core. In contrast, during core cooling the preform's inner surface is in contact with a cold core, but its outer surface is exposed to air which is a less efficient means of heat transfer.

In the prior art robotic cooling (RC), the mold is opened at a later time B. In this case, the preform exits the mold at a lower temperature, and is then cooled at a lower rate of cooling (because only one external surface of the preform is in contact with the cold tube cavity, as opposed to both inner and outer surfaces being in contact with cold surfaces in the mold).

By way of further comparison, if the preform were to remain in the mold, it would follow temperature profile IMC at the higher rate of cooling.

What is important to note is the relative positions of times C, D and E, when the preform falls below a critical temperature $T_C$. Above this critical temperature, there is sufficient polymer mobility to allow molecular ordering, diffusion and/or hydrogen bonding at the layer boundaries, thus yielding improved layer adhesion and delamination resistance. Curve TC (according to the present invention) remains above the critical temperature for the longest time, namely until time E. In contrast, the robotic cooling passes below the critical temperature at an earlier time D, and the in-mold cooling at an even earlier time C.

The following two examples further illustrate the benefits of the prior invention over the prior art robotic cooling method.

EXAMPLE 1

In a first example, 54 gram, two-material/three-layer (2M3L) preforms for 2-liter carbonated soft drink (CSD)

containers were prepared. The preforms contained 60% (by total preform weight) of virgin PET (nominal 0.80 IV), encapsulating 40% recycled post-consumer PET (nominal IV 0.65). These preforms were prepared on a 4-cavity, coinjection system simulating a 14-second cycle as described in column 1 of Table I. The preforms were left on the cores for two cycles (24 seconds) with no external air cooling.

Control preforms utilizing the same layer structure were produced at a conventional 20-second 3-position robotic cycle.

Two liter PETalite™ (i.e., footed) CSD bottles were produced on a conventional 2-stage reheat blow molder.

Two hundred containers were filled with carbonated water at 4 volumes, capped and dropped from a height of 4 meters through a vertical tube onto a 100 mm steel plate. The bottles were inspected for layer delamination in the PETalite "foot pads" The results were as follows:

|  | Percent of Bottles With Foot Pad Delamination |
| --- | --- |
| Virgin PET Monolayer Controls | 0% |
| 2M3L Conventional Robotic Cooling | 15.0% |
| 2M3L Simulated Core Cooling | 3.5% |

Based on the above, it is concluded that core cooling provide improved PET to recycled-PET layer adhesion vs. the conventional robotic cooling approach. It is probable that the early preform removal from the injection cavity results in a higher average preform temperature at the layer boundaries for a longer period of time vs. conventional core and cavity cooling. It is believed that this higher time/temperature condition results in additional molecular ordering and diffusion at the layer boundary, thus yielding improved layer adhesion and delamination resistance. It is believed that any Two-polyester material preform having a difference in IV of 0.1 or greater would benefit from the improved delamination resistance according to this invention.

EXAMPLE 2

In a second example, 50 gram, two-material/five-layer (2M5L) preforms were produced in a similar fashion, utilizing virgin PET (nominal IV 0.80) at 98% of the total preform weight, and ethylene vinyl alcohol (EVOH) at 2% of the total preform weight. The virgin PET formed inner, core and outer layers, and the EVOH formed inner and outer intermediate layers. Conventional and simulated core cooling preforms were produced vs. virgin PET monolayer controls at the same cycle times utilized in the prior example.

Heinz™ ketchup (28-oz) bottles were blown on a 2-stage reheat blow molder, utilizing conventional process conditions. Two hundred bottles from each were filled with water, capped and dropped at room temperature from a height of one meter through a vertical tube onto a steel plate and inspected for layer separation (delamination). The results were as follows:

|  | Percent of Bottles With Delamination |
| --- | --- |
| Virgin PET Monolayer Controls | 0% |
| 2M5L Conventional Robotic Cooling | 23.5% |
| 2M5L Simulated Core Cooling | 8.5% |

Unlike the PET multilayer structure of Example 1, the PET/EVOH layers do not utilize true chemical adhesion to effect layer integrity. PET and EVOH are not melt compatible. As such, true molecular adhesion does not occur. Hydrogen bonding, however, provides a sufficient level of layer attraction to prevent layer separation during normal use conditions. (Upon severe abuse, i.e., mechanical grinding, the layers separate, permitting the materials to be sorted for recycling, etc.) It is believed that the higher time/temperature conditions experienced by the layer boundaries of the simulated core cooling samples results in increased polymer mobility/ordering and higher levels of hydrogen bonding, yielding an increase in resistance to drop impact delamination.

Thermoplastic polymer materials which may be used in this invention are preferably polyesters based on polyalkylene, and in particular, polyethylene terephthalate (PET). PET polymers are prepared by polymerizing terephthalic acid or its ester-forming derivative with ethylene. The polymer comprises repeating units of ethylene terephthalate of the formula:

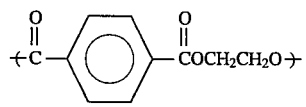

POLY(ETHYLENE TEREPHTHLATE)  (PET)

The present invention contemplates the use of copolymers of polyethylene terephthalate in which a minor proportion, for example, up to about 10% by weight, of the ethylene terephthalate units are replaced by compatible monomer units. Thus, as used herein "PET" means PET homopolymer and PET copolymers of the grades suitable for making containers, which are well known in the art. The glycol moiety of the monomer may be replaced by aliphatic or alicyclic glycols such as cyclohexanedimethanol (CHDM), trimethylene glycol, polytetramethylene glycol, hexamethylene glycol, dodecamethylene glycol, diethylene glycol, polyethylene glycol, polypropylene glycol, propane-1,3-diol, butane-1,4-diol, and neopentyl glycol, bisphenols, and other aromatic diols such as hydroquinone and 2,2-bis(4'-B-hydroxethoxyphenyl) propane. Examples of dicarboxylic acid moieties which may be substituted into the monomer unit include aromatic dicarboxylic acids such as isophthalic acid (IPA), phthalic acid, naphthalenedicarboxylic acid, diphenyldicarboxylic acid, diphenoxyethanedicarboxylic acids, bibenzoic acid, and aliphataic or alicyclic dicarboxylic acids such as adipic acid, sebacic acid, azelaic acid, decanedicarboxylic acid and cyclohexanedicarboxylic acid. In addition, various multifunctional compounds such as trimethylolpropane, pentaerythritol, trimellitic acid and trimesic acid can be copolymerized with the polyethylene terephthalate polymer.

The polyethylene terephthalate polymers may contain other compatible additives and ingredients which do not adversely affect the performance characteristics of the container, such as adversely affecting the taste or other properties of products packaged therein. Examples of such ingredients include thermal stabilizers, light stabilizers, dyes, pigments, plasticizers, fillers, antioxidants, lubricants, extrusion aids, residual monomer scavengers and the like.

The intrinsic viscosity (I.V.) effects the processability of the polyester resins. Polyethylene terephthalate having an intrinsic viscosity of about 0.8 is widely used in the CSD industry. Resins for various applications may range from about 0.55 to about 1.04, and more particularly from about 0.65 to 0.85. Intrinsic viscosity measurements are made according to the procedure of ASTM D-2857, by employing 0.0050±0.0002 g/ml of the polymer in a solvent comprising o-chlorophenol (melting point 0° C.), respectively, at 30° C. Intrinsic viscosity (I.V.) is given by the following formula:

$$I.V.=(\ln(V_{Soln.}/V_{Sol.}))/C$$

where:

$V_{Soln.}$ is the viscosity of the solution in any units;

$V_{Sol.}$ is the viscosity of the solvent in the same units; and

C is the concentration in grams of polymer per 100 mls of solution.

Also useful is a commercially-available, relatively high copolymer content PET known as PETG, a cyclohexane dimethanol/PET copolymer sold by Eastman Chemical, Kingsport Tenn.

Also useful as a base polymer or as a high-oxygen barrier layer is a packaging material with physical properties similar to PET, namely polyethylene naphthalate (PEN), but which also provides a 3–5X improvement in barrier property and enhanced thermal resistance, at some additional expense.

Polyolefins may also be used as the base polymer. Other options include acrylic/imide, polyamides (both aromatic and aliphatic), amorphous nylon, and acrylonitrile styrene. A preferred aromatic polyamide is a polymer formed by polymerizing metaxylylenediamine ($H_2NCH_2$—m—$C_6H_4$—$CH_2NH_2$) with adipic acid ($HO_2C(CH_2)_4CO_2H$), for example a product manufactured and sold by Mitsubishi Chemicals, Japan, under the designation MXD-6. A preferred polyamide of non-aromatic nature is nylon-6,6. Copolymers of polyamides and other polymers may be used.

Oxygen barrier layers other than EVOH and PEN may include polyvinyl alcohol (PVOH), polyvinyldene chloride (PVDC), nylon 6, MXD-6, LCP (liquid crystal polymer), amorphous nylon, polyacrylonitrile (PAN) and styrene acrylonitrile (SAN).

It should be understood that many variations of: the molding equipment (e.g., vertical injection molding, horizontal injection molding, extrusion molding, size of mold cavity and core arrays, etc.); the preform structure (e.g., number of layers, shape, dimensions, thickness of layers, etc.); thermoplastic polymers (e.g., polyester, polypropylene, polyvinyl chloride, etc.) and other layer materials (e.g., oxygen barrier, moisture barrier, carbon dioxide barrier, thermal resistant, recycled polymers, colored, etc.), may be used without departing from the spirit of the invention.

Thus, although several embodiments of this invention have been specifically illustrated and described herein, it is to be understood that variations may be made in the materials, the preform construction, the container construction and the methods of forming the preform and container without departing from the spirit and scope of the invention as defined by the appended claims.

What is claimed is:

1. In a method of forming multilayer plastic preforms, wherein a first array of cores is positioned in an associated array of mold cavities, the mold cavities are filled to form a first plurality of multilayer preforms on the first array of cores, the first array of preforms are cooled in the mold by contact with the mold cavities and cores at a relatively high first rate of cooling, and the first array of preforms are then removed from the mold cavities for further cooling, the improvement comprising:

reducing the cooling time in the mold by removing the first array of cores and preforms from the mold cavities as soon as the preforms are able to cool on the cores without significant physical deformation of the preforms; and cooling the multilayer preforms on the cores at a second cooling rate relatively lower than the first Cooling rate so as to maintain the preforms at a higher temperature for a longer time and enable an increase in molecular ordering, diffusion and/or bonding at the layer boundaries, thus yielding an improved delamination resistance.

2. The method of claim 1, further including:

providing a second array of cores in the mold cavities to form a second plurality of multilayer preforms while the first plurality of preforms is cooling on the first array of cores outside the mold cavities.

3. The method of claim 2, wherein the first and second arrays of cores are provided on a turret which is rotated for sequentially positioning the first and second arrays of cores in the mold cavities.

4. The method of claim 3, further including providing additional arrays of cores on the turret, and wherein the preforms are allowed to cool on the cores for more than one molding cycle.

5. The method of claim 1, wherein there is molecular bonding between the preform layers.

6. The method of claim 1, wherein the multiple layers include adjacent layers of polyester polymers having an intrinsic viscosity difference of greater than on the order of 0.1.

7. The method of claim 6, wherein one polyester layer is virgin PET and an adjacent layer is recycled PET.

8. The method of claim 1, wherein the multiple layers include adjacent layers of polymer resins that are not melt compatible.

9. The method of claim 1, wherein there is hydrogen bonding between the preform layers.

10. The method of claim 9, wherein one layer is PET and an adjacent layer is EVOH.

11. The method of claim 8, wherein one layer is PET and an adjacent layer is MXD-6 nylon.

12. The method of claim 1, wherein the cooling time in the mold is reduced by a factor of ⅓.

13. The method of claim 1, wherein the cooling time in the mold is reduced to no greater than about two seconds.

14. The method of claim 1, wherein the multiple layers include adjacent layers of different polymers without adhesives.

15. The method of claim 1, wherein the preform has a sidewall including a core side adjacent the core, a cavity side adjacent the mold cavity, and a center between the core and cavity sides, and wherein during cooling on the cores outside the mold there is a temperature gradient across the sidewall of the preform, the core side being relatively cooler, the center relatively warmer compared to the core side, and the cavity side is intermediate of the core and cavity sides, and wherein radial and axial shrinkage forces across the sidewall are low and uniform due to the core restricting the core side shrinkage.

16. The method of claim 1, wherein the preform has a sidewall and during cooling on the cores outside the mold the amount of shrinkage across the preform sidewall is substantially uniform.

17. The method of claim 1, wherein the preform has a sidewall and during cooling on the cores outside the mold there are low radial and axial shrinkage forces across the preform sidewall.

18. The method of claim 1, wherein the preform has a sidewall with an outer cavity side adjacent the mold cavity, and wherein the preforms are removed from the mold cavities as soon as the outer cavity side of the preform has cooled from a molten fluid to a semi-rigid glassy state.

19. The method of claim 1, wherein the mold cavities and cores have cooling channels through which a cooling fluid is passed.

20. The method of claim 1, wherein the method is used for large volume commercial production of preforms for blow molded containers.

21. The method of claim 20, wherein the containers are single-service beverage containers.

22. The method of claim 1, wherein the time in which the preform layers remain above a critical temperature which enables the increase in molecular ordering, diffusion and/or bonding at the layer boundaries, is increased compared to robotic cooling methods.

23. The method of claim 1, wherein containers blow molded from the preforms have a reduced rate of delamination failure compared to containers blow molded from preforms cooled by robotic cooling methods.

24. The method of claim 1, further comprising transferring the cooled preform to a conveyor or storage container, and wherein the combined cooling time in the mold and cooling time on the cores is reduced compared to robotic cooling methods.

25. The method of claim 1, wherein the method of forming is injection molding.

26. The method of claim 1, wherein the multiple layers include layers of thermoplastic polymers.

27. The method of claim 26, wherein the thermoplastic polymers are selected from the group consisting of polyesters, polyolefins, acrylic/imide, polyamides, amorphous nylon and acrylonitrile styrene.

28. The method of claim 27, wherein the polyesters are selected from the group consisting of virgin and recycled PET, PEN, PETG and copolymers thereof.

29. The method of claim 26, wherein the multiple layers include layers of barrier materials selected from the group consisting of oxygen barrier materials, moisture barrier materials, and carbon dioxide barrier materials.

30. The method of claim 29, wherein the barrier materials are oxygen barrier materials selected from the group consisting of EVOH, PEN, PVOH, PVDC, nylon 6, MXD-6, LCP, amorphous nylon, PAN and SAN.

* * * * *

UNITED STATES PATENT AND TRADEMARK OFFICE
CERTIFICATE OF CORRECTION

PATENT NO. : 5,582,788
DATED : December 10, 1996
INVENTOR(S) : Collette et al.

It is certified that error appears in the above-indentified patent and that said Letters Patent is hereby corrected as shown below:

Col. 1, line 28 - delete "pose" and substitute -- post --.

Col. 3, line 62 - delete "portion indicate 41" and substitute -- portion 41 indicated at --.

Signed and Sealed this

Fourteenth Day of October, 1997

Attest:

BRUCE LEHMAN

Attesting Officer        Commissioner of Patents and Trademarks